United States Patent
Saunders et al.

(10) Patent No.: US 9,229,836 B2
(45) Date of Patent: Jan. 5, 2016

(54) COEXISTING STANDARD AND PROPRIETARY CONNECTION USAGE

(71) Applicant: Intel Corporation, Santa Clara, CA (US)

(72) Inventors: Bradley Saunders, Portland, OR (US); Robert Dunstan, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/690,965

(22) Filed: Nov. 30, 2012

(65) Prior Publication Data

US 2014/0156875 A1 Jun. 5, 2014

(51) Int. Cl.
*G06F 3/00* (2006.01)
*G06F 11/30* (2006.01)
*G06F 13/38* (2006.01)
*G06F 13/40* (2006.01)
*G06F 9/44* (2006.01)

(52) U.S. Cl.
CPC .......... *G06F 11/3051* (2013.01); *G06F 9/4411* (2013.01); *G06F 13/385* (2013.01); *G06F 13/387* (2013.01); *G06F 13/4068* (2013.01); *G06F 13/4086* (2013.01)

(58) Field of Classification Search
USPC ........................ 710/10, 11, 14, 15
See application file for complete search history.

(56) References Cited

U.S. PATENT DOCUMENTS

| | | | |
|---|---|---|---|
| 5,812,951 A | 9/1998 | Ganesan et al. | |
| 6,009,480 A | 12/1999 | Pleso | |
| 6,810,481 B1 * | 10/2004 | Kawade et al. | 713/300 |
| 8,099,502 B2 | 1/2012 | Genske et al. | |
| 8,112,556 B2 | 2/2012 | Hanson et al. | |
| 2009/0228379 A1 * | 9/2009 | Honts et al. | 705/30 |
| 2010/0146155 A1 * | 6/2010 | Brock | 710/11 |
| 2012/0003863 A1 * | 1/2012 | Sung et al. | 439/489 |
| 2012/0265911 A1 * | 10/2012 | Connolly | 710/300 |

FOREIGN PATENT DOCUMENTS

| | | |
|---|---|---|
| JP | 49-84503 B2 | 7/2012 |
| TW | 201227321 A | 7/2012 |
| WO | 2014/085162 A1 | 6/2014 |

OTHER PUBLICATIONS

International Search Report and Written Opinion received for PCT Patent Application No. PCT/US2013/071008, mailed on Feb. 25, 2014, 11 pages.

* cited by examiner

*Primary Examiner* — Farley Abad
(74) *Attorney, Agent, or Firm* — International IP Law Group, P.L.L.C.

(57) ABSTRACT

A method for coexisting standard connection and proprietary connection use is disclosed. The method may include connecting a peripheral device to a host computing device, wherein the peripheral device is connected via one of a standard connection type and a proprietary connection type. The method may include detecting the connection type. The method may include determining if the connection type is supported by the host computing device. The method may also include rendering a message indicating the connection type is not supported by the host system if the connection type is not supported.

21 Claims, 8 Drawing Sheets

300

600

COEXISTING STANDARD AND PROPRIETARY CONNECTION USAGE

TECHNICAL FIELD

The present invention generally relates to techniques for providing support for standardized and proprietary devices to a host computing device. Specifically, the present invention relates to determining if a connection type of the peripheral device is standard (as opposed to proprietary), and if proprietary if it is supported by the host computing device and rendering a message if it is not supported.

BACKGROUND ART

Today's computers support a wide variety of interface technologies for communicating with peripheral devices. Different interface technologies provide different advantages depending on the type of peripheral device being connected. Some interface technologies may be a standard connection type associated with standard specification interface protocols. For example, a universal serial bus (USB) connection type is associated with a USB standard specification interface protocol. Other interface technologies may be a proprietary connection type that while using a standard connection type attempts to interface with the host computer via a proprietary interface protocol.

BRIEF DESCRIPTION OF THE DRAWINGS

The same numbers are used throughout the disclosure and the figures to reference like components and features. Numbers in the 100 series refer to features originally found in FIG. 1; numbers in the 104 series refer to features originally found in FIG. 2; and so on.

DESCRIPTION OF THE EMBODIMENTS

The present disclosure describes techniques for providing support for connecting standardized and proprietary devices to a host computing device. Each standard connection type includes standardized techniques for establishing connections to a host device using the connector of the standard. In this manner, the host computing device can rely on a standard connector to perform according to the established standards. Existing I/O standard connection types, such as USB, may work with some peripheral devices via proprietary signaling methods. For example, a host computing device may be coupled to a peripheral device via a mobile high-definition link (MHL) that uses a USB connector to provide an audio and video signal from a mobile phone to a high-definition television (HDTV). Using the USB connector for a MHL includes using components of the USB connection in a manner not prescribed by the USB standard. In some embodiments, the host computing device does not support the proprietary interface protocols. In this embodiment, the host computing device may render a message that indicates that the proprietary interface protocol of the proprietary connection type is not supported.

A connection type, as referred to herein, is a combination of wires of a connector-based interface and an interface protocol that is configured to provide power, control and data signals over the wires of the interface. A connection type may either be a standard connection type, or a proprietary connection type.

The "standard connection type," as referred to herein, is a connection type associated with an industry standardized connector and interface protocol. The term "standard device," as referred to herein, is a device that uses a standard connection type—the standard connection type being associated with an industry standardized interface protocol. In some embodiments, the standardized interface protocol specification may include one or more of a universal serial bus (USB) interface protocol, a high-definition media interface (HDMI) interface protocol, or a DisplayPort interface protocol.

The "proprietary connection type," as referred to herein, is a connection type associated with a standard connector but uses a proprietary interface protocol. In some embodiments, the proprietary connection type may include a mobile-high definition link (MHL) interface protocol. The MHL interface protocol may be configured to use a proprietary interface protocol and physical lanes associated with a standard connection type, such as a USB connection type. In other words, the MHL connection type may "hi-jack" the USB data wires associated with the USB port, and provides an encoded video signal to the host computing device. The term "proprietary device," as referred to herein, is a device that uses a proprietary connection type—the proprietary connection type being associated with a proprietary interface protocol.

Figure 1:
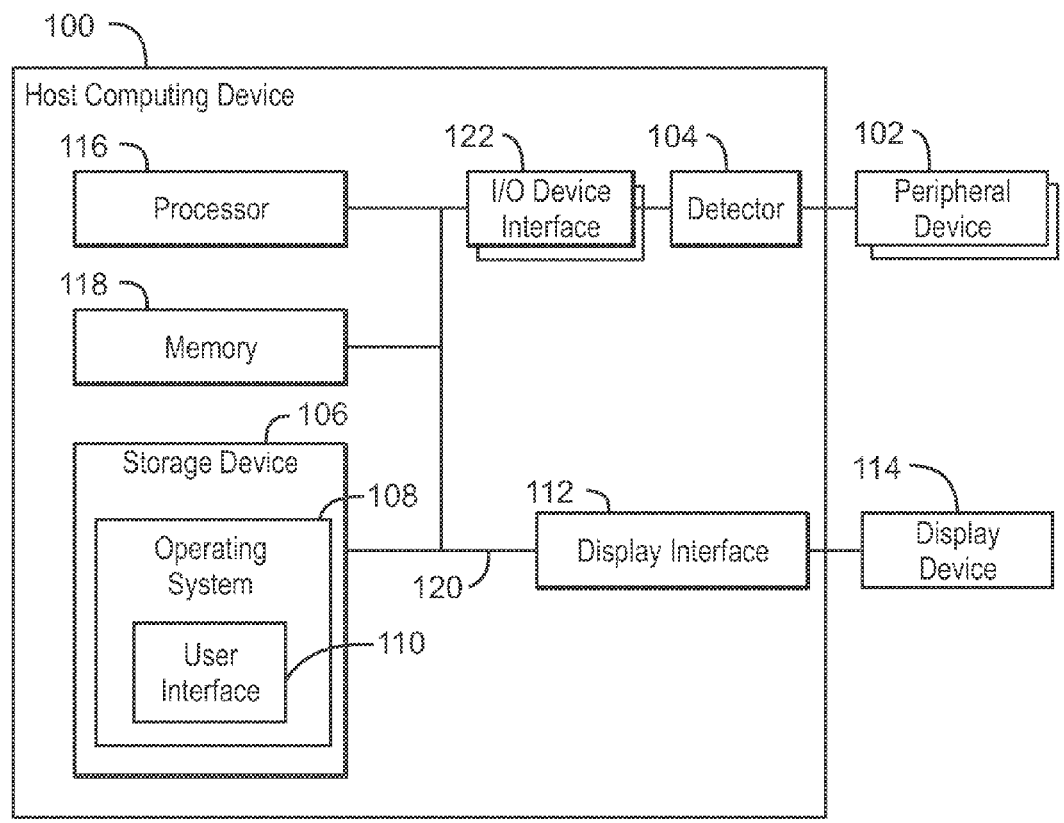
FIG. 1 is a block diagram of a system including a host computing device communicatively coupled to a peripheral input/output (I/O) device.

FIG. 1 is a block diagram of a system including a host computing device 100 communicatively coupled to a peripheral input/output (I/O) device 102. The host computing device 100 may include a detector 104. The detector 104 may be configured to detect a type of connection comprising one of a standard connection type and a proprietary connection type used to connect the peripheral device 102 to the host device 100. Accordingly, the peripheral device may be a standard device or a proprietary device. The detector 104 may be configured to determine if the connection type used by the peripheral device is supported by the host computing device 100. The host computing device 100 may also include a storage device 106, and an operating system 108 installed thereon. The operating system 108 may also include a user interface 110. The user interface 110 may be configured to render a message indicating when the connection type is not supported by the host computing device 100.

The host computing device 100 may be, for example, a laptop computer, desktop computer, tablet computer, mobile device, a television, a server, among others. The host computing device 100 may include a main processor 116 that is adapted to execute stored instructions, as well as a memory device 118 that stores instructions that are executable by the main processor 116. The main processor 116 can be a single core processor, a multi-core processor, a computing cluster, or any number of other configurations. The main processor 116 may be implemented as Complex Instruction Set Computer (CISC) or Reduced Instruction Set Computer (RISC)

processors, x86 Instruction set compatible processors, multi-core, or any other microprocessor or central processing unit (CPU). In some embodiments, the main processor 116 includes dual-core processor(s), dual-core mobile processor(s), or the like.

The memory device 118 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions stored in the memory device 118 and that are executed by the main processor 116 may be used to render the message indicating the when the connection type is not supported.

The main processor 116 may be connected through a system bus 120 (e.g., PCI, ISA, PCI-Express, HyperTransport®, NuBus, etc.) to an input/output (I/O) device interface 122 adapted to connect the host computing device 100 to a peripheral device 102.

The peripheral device 102 may include, for example, a smartphone, a keyboard and a pointing device, wherein the pointing device may include a touchpad or a touchscreen, a peripheral device such as a camera, a media player, a printer, among others. The peripheral device 102 may be a host computing device similar to the host computing device 100. The I/O device interface 122 may be configured to interface with the peripheral device via one or more interface protocols. The interface protocols may include interface protocols supported by the host computing device 100. The detector 104 may be configured to detect whether or not the interface protocols of the peripheral device are supported by the host computing device 100.

The main processor 116 may also be linked through the system bus 120 to a display interface 112 adapted to connect the host computing device 100 to a display device 114. The display device 114 may include a display screen that is a built-in component of the host computing device 100. The display device 114 may also include a computer monitor, television, or projector, among others, that is externally connected to the host computing device 100. In some embodiments, the user interface 110 may be a graphical user interface displayed on the display device 114. Alternatively or additionally, the message indicating when the connection type is not supported by the host computing device 100 may be displayed on the display device 114. Moreover, the display device 114 may also be connected to the host computing device using the detector. In this manner, the display device may be either a standard or a proprietary device.

The storage device 106 may include a physical memory such as a hard drive, an optical drive, a flash drive, an array of drives, or any combinations thereof. The storage device 106 may also include remote storage drives. The storage device 106 may store instructions thereon to enumerate the peripheral device 102 according to a specification associated with the device when the connection type is supported. For example, the peripheral device 102 may be connected to the host computing device 100 via a USB connection type. When a standard USB device is first connected to the host computing device 100 as the peripheral device, an enumeration process is started. The enumeration starts by sending a reset signal to the standard USB device. The data rate of the USB connection type is determined during the reset signaling. After reset, the USB connection type's information is read by the host computing device 100 and the USB connection type is assigned a unique 7-bit address. If the USB connection type is supported by the host computing device 100, the device drivers needed for communicating with the standard USB device via the USB connection type are loaded at the host computing device 100, and the USB connection type is set to a configured state. If the host computing device 100 is restarted, the enumeration process is repeated for all connected peripheral devices 102.

Figure 2:
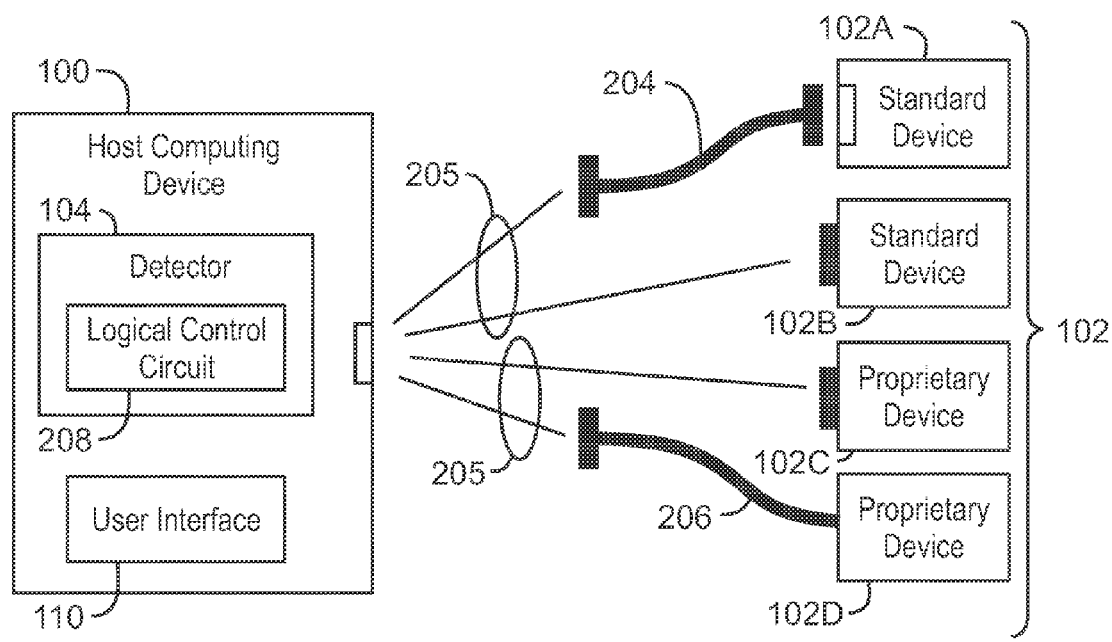
FIG. 2 is a process flow diagram illustrating embodiments of the peripheral device communicatively coupled to the host computing device.

FIG. 2 is a block diagram illustrating embodiments of the peripheral device 102 communicatively coupled to the host computing device 100. FIG. 2 illustrates alternative embodiments of the peripheral device 102. The peripheral device 102 may be a standard device 102A, 102B or a proprietary device 102C, 102D. In some embodiments, the peripheral device 102 (either the standard device 102A or the proprietary device 102B) may be connected via a cable 204, 206 to the host computing device 100. In other embodiments, the peripheral device 102, either the standard device 102B or the proprietary device 102C, may be connected directly to the host computing device 100. In either embodiment, the peripheral device 102 may be connected to the host computing device as indicated by the arrows 205. As discussed above in reference to FIG. 1, the host computing device 100 may include a detector 104. The detector 104 may include a logical control circuit 208. The logical control circuit 208 may be configured to receive a signal indicating the connection type from the peripheral device 102.

As mentioned above, the detector 104 may detect a connection type. In some embodiments, detecting the type of connection may include identification of a vendor associated with the connection type based on one or more at a vendor identification index value, a textual representation of the vendor that can be directly rendered in the message, or any combination thereof. In other embodiments, detecting the type of connection may simply be a determination of whether the connection type is supported without identification of a vendor associated with the connection type.

The rendered message is be carried out by any appropriate messaging mechanism, and rendering the message may be as simple as illuminating an indicator light (not shown) that may enable a user to know whether a device is supported or not. In some embodiments, the rendered message may be a textual representation of the vendor of the connection type that is displayed by the host computing device 100. The textual representation of the vendor may include one or more of a manufacturer associated with the connection type, a common name of the connection type, a model number associated with the connection type, version information or any combination thereof. In other embodiments, the message rendered may instruct a user to contact the manufacturer of a connection type that is not supported by the host computing device 100. For example, the peripheral device 102 may be a smartphone and the host computing device 100 may be a high-definition television (HDTV). The smartphone may connect to the HDTV via a MHL connection type. Because not all HDTVs are configured to recognize a MHL connection type, the HDTV may render a message to be displayed on the HDTV that the device is not supported by the HDTV and to contact the manufacturer of the MHL connection type. By rendering the message, a user may be informed that a host computing device does not support the connection type.

As another example, the connection type may be defined in a standardized industry specification including the USB Power Delivery specification. An extension of the USB Power Delivery Specification may be used to identify the connection type prior to enumerating the connection type using standards-based methods, i.e., USB enumeration, versus leaving the method for enumerating and/or configuring the interface with the connection type based on a proprietary method implemented by the host computing device.

It should be noted that the configuration of the interface between the host computing device 100 and the proprietary connection type can vary in relation to the interface between the host computing device and standard connections. In other words, once the method for discovering standard versus proprietary connection types is complete, the host computing device and proprietary connection type can reconfigure the interface between them to align with the capabilities of the peripheral device. In a USB example, this might include having the high-speed data channels, which normally operate per the USB specification, be reconfigured to pass a different protocol or use a different electrical signaling specification. The host computing device that supports such proprietary connection types may also be configured to meet the specification for the standard operation, including passing the compliance and interoperability requirements when standard connection types are used.

Figure 3:
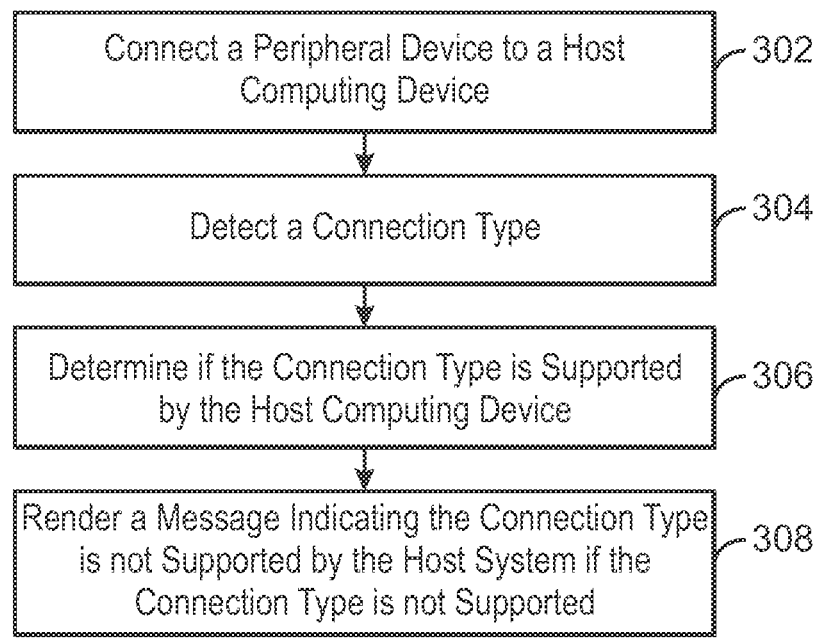
FIG. 3 is a block diagram illustrating a method to provide support for standardized and proprietary devices communicatively coupled to a host computing device

FIG. 3 is a process flow diagram illustrating a method 300 to provide support for standardized and proprietary devices communicatively coupled to a host computing device. At block 302, a peripheral device is connected to a host computing device. The peripheral device is connected via one of a standard connection type and a proprietary connection type. At block 304, the connection type is detected. At block 306, whether the connection type is supported by the host computing device is determined. At block 308, a message is rendered indicating the connection type is not supported by the host system if the connection type is not supported.

In some embodiments, the method 300 may also include enumerating the peripheral device according to a specification associated with the peripheral device when the connection type is supported. For example, the peripheral device may be connected to the host computing device via a MHL connection type that is supported by the host computing device. When the MHL connection type is first connected to the host computing device, the enumeration process is started.

In some embodiments, detecting, at block 304, the type of connection may include identification of a vendor associated with the connection type. The identification of the vendor may be based on a vendor identification index value identified during enumeration. In other embodiments, the identification of the vendor may be based on a textual representation of the vendor that can be directly rendered in the message comprising one or more of: a manufacturer associated with the connection type device, a common name of the connection type, a model number, and version information associated with the connection type. For example, the connection type may be an MHL connection type. If the MHL connection type is not supported by the host computing device, the vendor of the MHL connection type may be identified based on one of the elements recited above. The message rendered may use the vendor identification to display the vendor information when the device is not supported by the host computing system.

Figure 4:
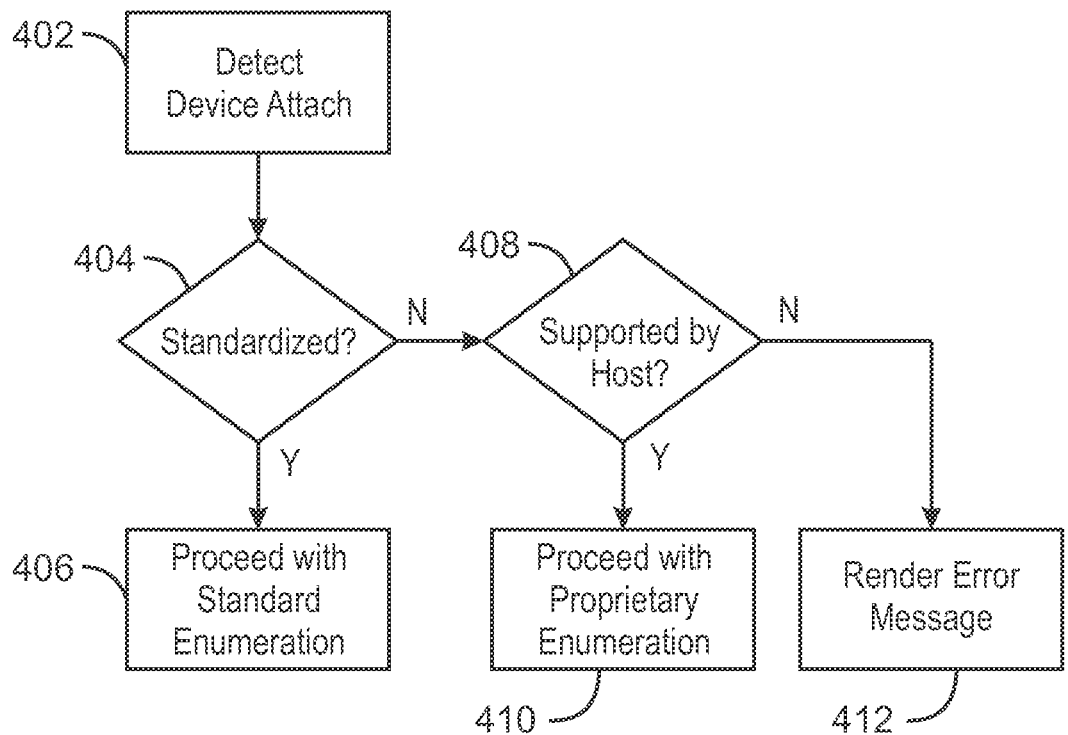
FIG. 4 is a flow diagram to determine if a connection type of the peripheral device is supported at the host computing device and render a message if it is not supported.

FIG. 4 is a process flow diagram 400 to determine if a connection type of the peripheral device 102 is supported at the host computing device and render a message if it is not supported. At block 402, the peripheral device may be attached to the host computing device via a connection type. At block 404, the host computing device may determine whether or not the connection type is a standardized connection type, such as USB, HDMI, or DisplayPort. If the connection type is standardized, at block 406, the host computing device may proceed with standard enumeration as discussed above with respect to FIG. 1. If the connection type is not standard, but is a proprietary connection type, such as a MHL connection type, the host computing device may verify at block 408 that the proprietary connection type is supported by the host computing device. If the proprietary connection type is supported by the host computing device, the host computing device will proceed, at block 410, with proprietary enumeration. However, if the proprietary device is not supported by the host computing device, an error message may be rendered at block 412.

Figure 5A:
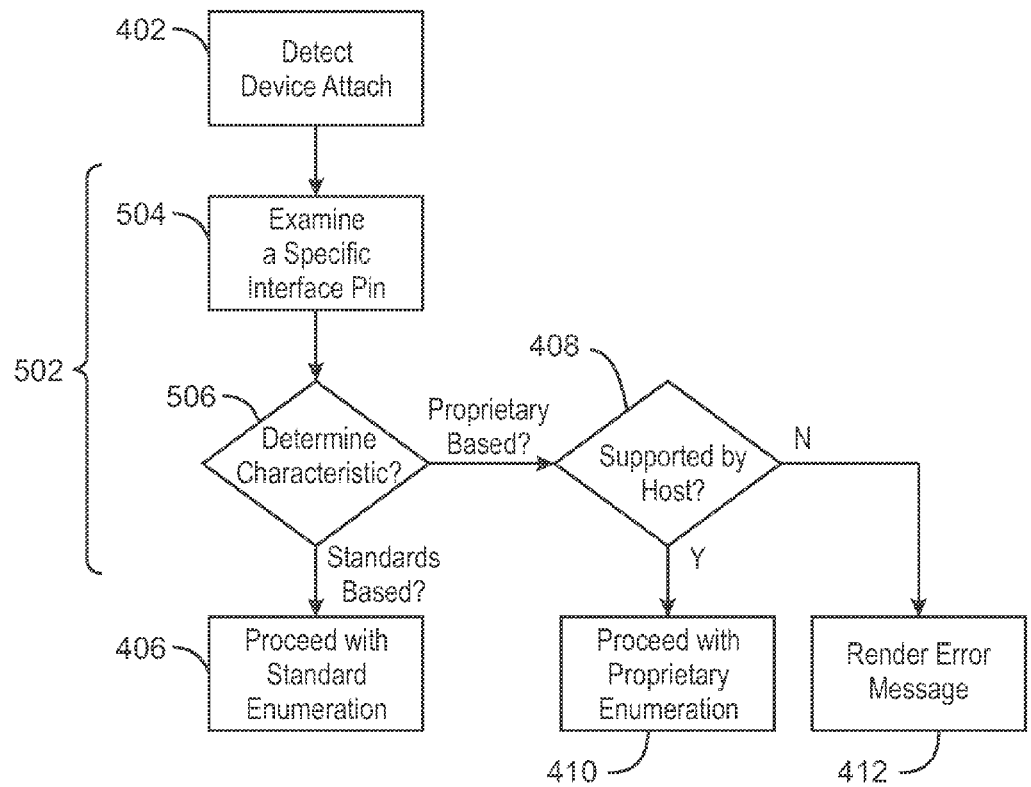
FIGS. 5A-5B are flow diagrams illustrating embodiments of determining if the connection type is a standardized connection type.
Figure 5B:
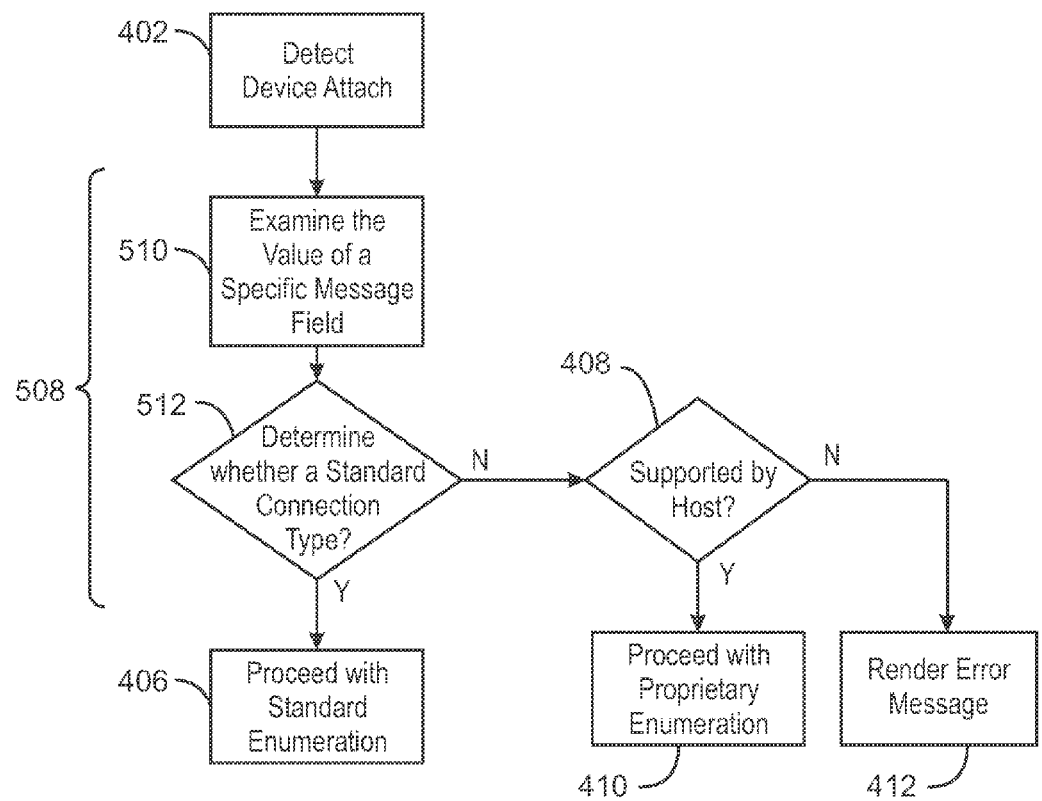

FIGS. 5A-5B are flow diagrams illustrating embodiments of determining if the connection type is a standardized connection type. In reference to FIG. 4, determining, at block 404, whether or not the connection type is a standardized connection type may be carried out by one or more methods. FIG. 5A, illustrates a first method 502 of determining if the connection type is a standardized connection type. At block 504, an interface pin at the connection type is examined. The interface pin may exhibit a characteristic indicating the connection type. For example, the characteristic may be a polarity predefined to indicate a connection type. In other embodiments, the characteristic may be a resistance level, an impedance level, a voltage level, a current level, and the like. In other words, the interface pin is examined at block 504 to determine the characteristic at block 506. In the case of a polarity characteristic, a high polarity may indicate that the connection type is a standard connection type. A low polarity may indicate that the connection type is a proprietary connection type. The first method 502 may be quick and less expensive when compared to the second method, discussed below, since the method may involve hardware only. The first method 502 can also vary by implementation, for example the pin may have more than one functionality as long as the determination of standard versus proprietary connection types is distinct for purposes of this determination at interface attach time.

FIG. 5B, illustrates a second method 508 of determining if the connection type is a standardized connection type. The second method 508 may include, at block 510, examining the value of a message field provided via the connection type in initial communication over the configuration interface. Similar to the first method 502, the second method 508 may vary in how it is implemented. For example, the value and message field may vary from the state of a single bit in the communications stream to a deterministic pattern or value in a multi-use field of the communication. The method 508 may also include, at block 512, determination of whether the connection type is a standard connection type, may occur as the next sequential step following device attach (402 of FIG. 4) in order to know if a standards-based method should be used to configure the remaining aspects of the interface or if a proprietary method should be used.

Figure 6A:
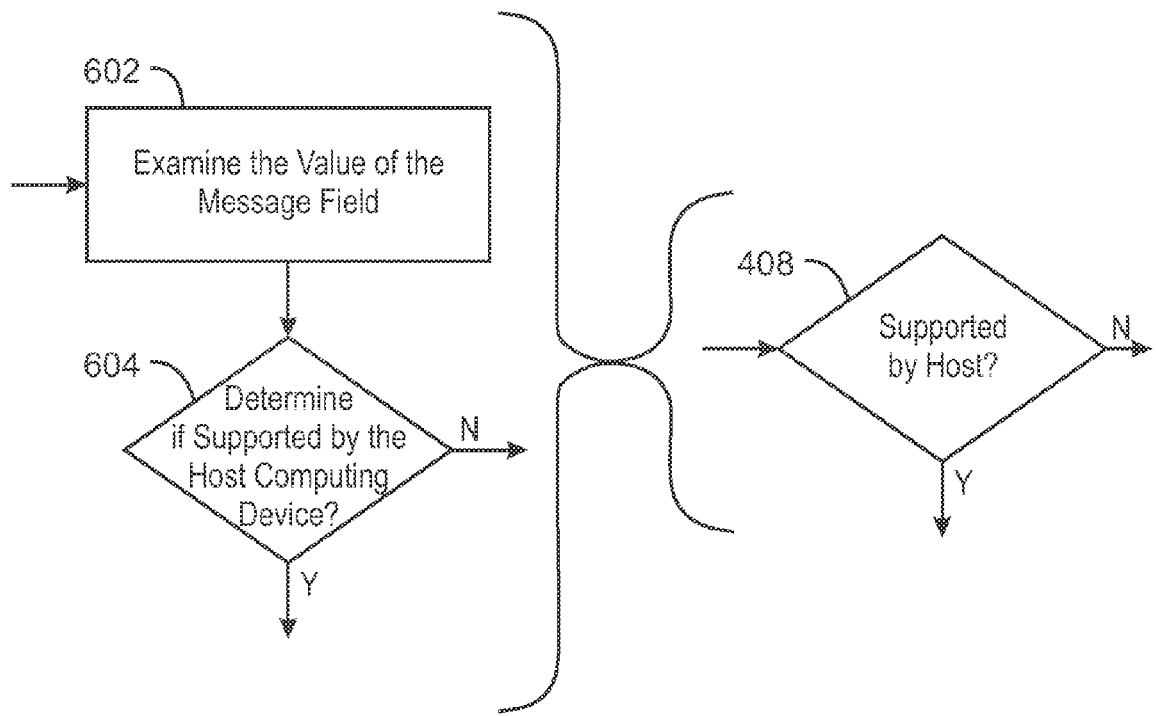
FIG. 6A-6B are flow diagrams to determine whether a proprietary connection type is supported.
Figure 6B:
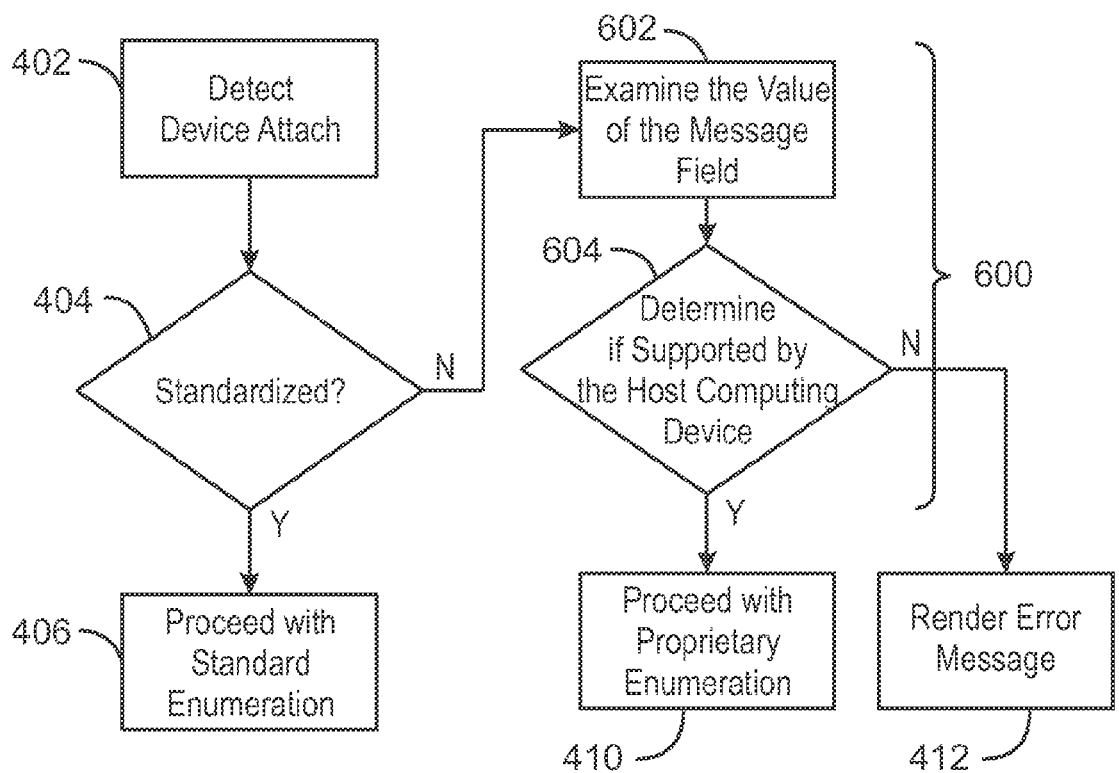

FIGS. 6A-6B are flow diagrams to determine whether a proprietary connection type is supported. The host computing device may be connected to the peripheral device via a proprietary connection type. In reference to FIG. 4, verifying, at block 408, may be carried out by additional processes. The method 600, illustrated in FIG. 6, may be used to verify whether a proprietary connection type is supported by the host computing device. The method 600 may include, at block 602, examining the value of the message field to determine the identity of the proprietary connection type. The identity may be determined by receiving a vendor-specific identification number associated with the proprietary connection type. The method 600 may also determine, at block 604, if the proprietary connection type is supported by the host computing device. For example, the value of the field may indicate the vendor-specific identification value associated with the proprietary connection type that establishes to the host computing system the configuration of an interface to operate successfully. In contrast, the host computing system may not support the vendor-specific identification value, but render the information related to the vendor-specific identification value in a message. In some embodiments, the message may inform a user that the proprietary connection type is not supported. The message may also identify which vendor to approach to resolve the non-working proprietary connection type.

Some embodiments may be implemented in one or a combination of hardware, firmware, and software. Some embodiments may also be implemented as instructions stored on the tangible non-transitory machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for coexisting standard connection and proprietary connection use, comprising:
   connecting a peripheral device to a host computing device, wherein the peripheral device is connected via one of a standard connection type and a proprietary connection type;
   detecting the connection type;
   determining if the connection type is supported by the host computing device, wherein determining if the connection type is supported comprises:
      examining a polarity characteristic of an interface pin, wherein a high polarity indicates that the connection type is a standard connection type, and a low polarity indicates that the connection type is a proprietary connection type;
   configuring an interface between the host computing device and the connection type to align with the peripheral device in response to the connection type being supported; and
   rendering a message indicating the connection type is not supported by the host system if the connection type is not supported.

2. The method of claim 1, further comprising enumerating the peripheral device according to a specification associated with the peripheral device when the connection type is supported.

3. The method of claim 1, wherein detecting the type of connection comprises identification of a vendor associated with the connection type based on one or more of:
   a vendor identification index value;
   version data indicating a version of the connection type; and
   a textual representation of the vendor that can be directly rendered in the message comprising one or more of: a manufacturer associated with the connection type device, a common name of the connection type, and a model number associated with the connection type.

4. The method of claim 1, wherein the message rendered may instruct a user of a method to contact a manufacturer of a connection type that is not supported by the host computing device.

5. The method of claim 1, wherein detecting the type of connection is carried out by a logical control circuit within the host computing device, the logical control circuit to receive a signal indicating the connection type.

6. The method of claim 1, wherein the standard connection type is associated with an industry standardized interface protocol specification comprising:
   a universal serial bus (USB) interface protocol;
   a PCI Express (PCIe) interface protocol;
   a high-definition media interface (HDMI) interface protocol; or
   a DisplayPort interface protocol.

7. The method of claim 1, wherein the proprietary connection type comprises a proprietary interface protocol provided over a standardized interface connector.

8. A host computing device, comprising:
- a detector to detect a type of connection comprising one of a standard connection type and a proprietary connection type used to connect a peripheral device to the host computing device, wherein the detector is further to determine if the connection type is supported by the host computing device wherein determining if the connection type is supported comprises:
  - examining a polarity characteristic of an interface pin, wherein a high polarity indicates that the connection type is a standard connection type, and a low polarity indicates that the connection type is a proprietary connection type,
- and the host computing device is to configure an interface between the host computing device and the connection type to align with the peripheral device in response to the connection type being supported; and
- a user interface to render a message indicating when the connection type is not supported by the host computing device.

9. The host computing device of claim 8, wherein the connection type is a standard connection type, further comprising:
- a processor;
- a storage device comprising a non-transitory computer-readable medium to store instructions thereon that when executed by the processor cause the host computing system to enumerate the peripheral device according to a specification associated with the device when the connection type is supported.

10. The host computing device of claim 8, wherein detecting the type of connection comprises identification of a vendor associated with the connection type based on one or more of:
- a vendor identification index value;
- version data indicating a version of the connection type; and
- a textual representation of the vendor that can be directly rendered in the message comprising one or more of: a manufacturer associated with the connection type, a common name of the connection type, and a model number associated with the connection type.

11. The host computing device of claim 8, wherein the message rendered may instruct a user to contact a manufacturer of a connection type that is not supported by the host computing device.

12. The host computing device of claim 8, wherein the detector comprises a logical control circuit within the host computing device, the logical control circuit to receive a signal indicating the connection type.

13. The host computing device of claim 8, wherein the standard connection type is associated with an industry standardized specification comprising:
- a universal serial bus (USB) interface protocol;
- a PCI Express (PCIe) interface protocol;
- a high-definition media interface (HDMI) interface protocol; or
- a DisplayPort interface protocol.

14. The host computing device of claim 8, wherein the proprietary connection type comprises a proprietary interface protocol provided over a standardized interface connector.

15. A system, comprising:
- a host computing device;
- a peripheral device including a connection type to attempt an interface with the host computing device;
- a detector, of the host computing system, to detect the connection type comprising one of standard connection type and proprietary connection type, wherein the detector is further to determine if the connection type is supported by the host computing device, wherein determining if the connection type is supported comprises:
  - examining a polarity characteristic of an interface pin, wherein a high polarity indicates that the connection type is a standard connection type, and a low polarity indicates that the connection type is a proprietary connection type,
- and the host computing device is to configure an interface between the host computing device and the connection type to align with the peripheral device in response to the connection type being supported; and
- a user interface of the host computing device to render a message indicating when the connection type is not supported by the host computing device.

16. The system of claim 15, wherein the connection type is a standard connection type, further comprising:
- a processor of the host computing device;
- a storage device, of the host computing device, comprising a non-transitory computer-readable medium to store instructions thereon that when executed by the processor cause the host computing system to enumerate the peripheral device according to a specification associated with the device when the connection type is supported.

17. The system of claim 15, wherein detecting the type of connection comprises identification of a vendor associated with the connection type based on one or more of:
- a vendor identification index value;
- version data indicating a version of the connection type; and
- a textual representation of the vendor that can be directly rendered in the message comprising one or more of: a manufacturer associated with the connection type device, a common name of the connection type, and a model number associated with the connection type.

18. The system of claim 15, wherein the message rendered may instruct a user of a method to contact a manufacturer of a connection type that is not supported by the host computing device.

19. The system of claim 15, wherein the detector comprises a logical control circuit within the host computing device, the logical control circuit to receive a signal indicating the connection type.

20. The system of claim 15, wherein the standard connection type is associated with an industry standardized specification comprising:
- a universal serial bus (USB) interface protocol;
- a PCI Express (PCIe) interface protocol;
- a high-definition media interface (HDMI) interface protocol; or
- a DisplayPort interface protocol.

21. The system of claim 15, wherein the proprietary connection type comprises a proprietary interface protocol provided over a standardized interface connector.

* * * * *